E. M. Greeson
Cotton Thinning Machine
101962
PATENTED APR 12 1870
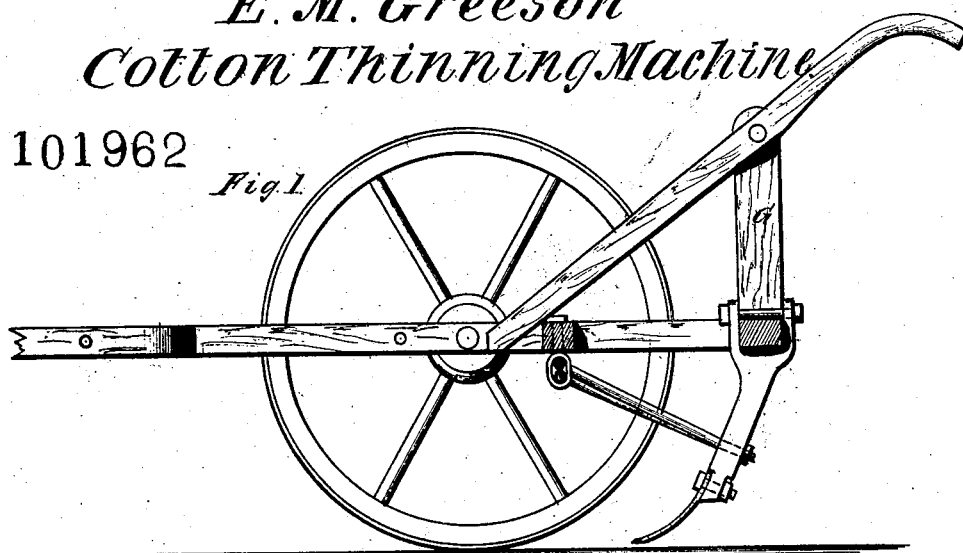
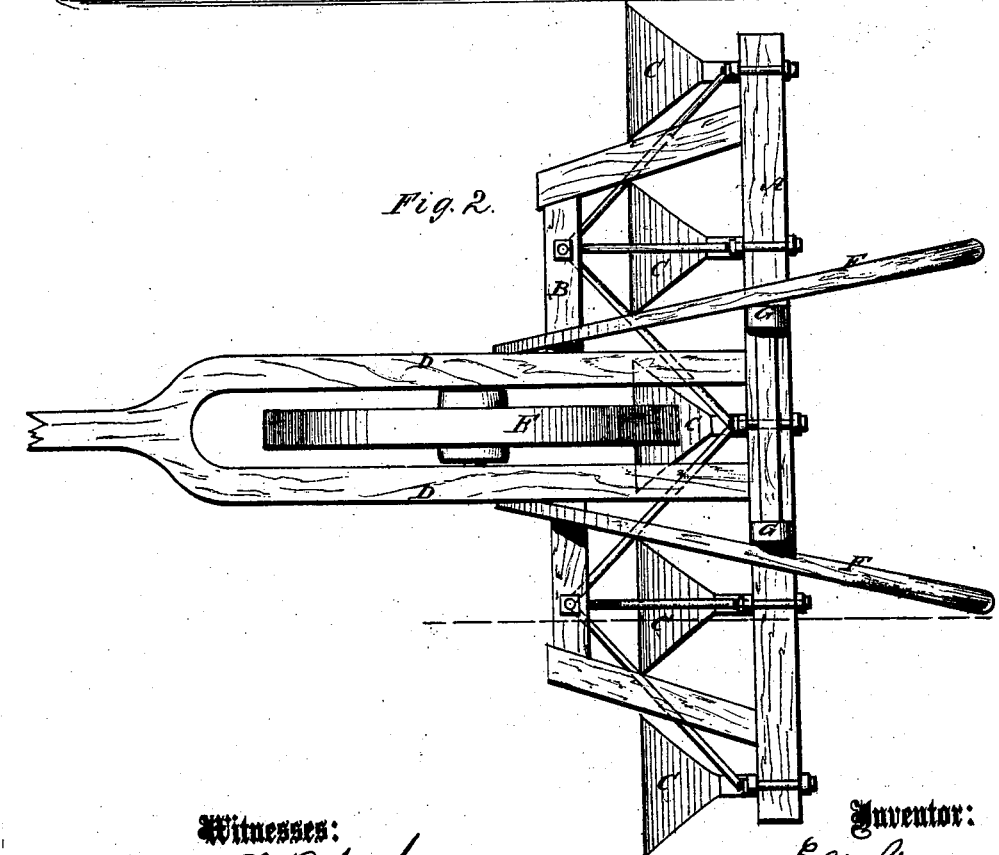
Witnesses:
Alex F. Roberts
Frank Blockley
Inventor:
E. M. Greeson
per Mmmm
Attorneys

United States Patent Office.

E. M. GREESON, OF AMERICUS, GEORGIA.

Letters Patent No. 101,962, dated April 12, 1870.

IMPROVEMENT IN COTTON-THINNING MACHINE.

The Schedule referred to in these Letters Patent and making part of the same

*To all whom it may concern:*

Be it known that I, E. M. GREESON, of Americus, in the county of Sumter and State of Georgia, have invented a new and useful Improvement in Cotton-Thinning Machines; and I do hereby declare that the following is a full, clear, and exact description thereof, which will enable those skilled in the art to make and use the same, reference being had to the accompanying drawings forming part of this specification.

The object of this invention is to provide a simple and efficient machine for thinning or "chopping out" the cotton along the rows at suitable intervals, as is the practice when the plants are small,-to make room for the larger growth.

The invention comprises an arrangement of a number of hoes or scrapers, at suitable intervals in a row, suspended from a beam or frame provided with guiding-handles, and connected at right angles to another frame, mounted adjustably on one wheel, to the front of which latter frame the animal is to be hitched for drawing the same across the rows of plants, all as hereinafter more fully specified.

Figure 1 represents a longitudinal section of my improved machine, and

Figure 2 represents a transverse section of the same.

A B represent parallel bars of a frame, from which, at the rear bars A, is suspended any suitable number of broad-edged curved hoes or cutters C, at suitable intervals apart, and so arranged as to deliver the earth scraped or hoed up mostly behind them.

In front of the center of this frame another frame, D, having a central space, projects and is mounted on a single wheel, E, working in the said space, the axle of which is adjustable along the said frame D.

F represents handles connected to the frame D, and to posts G of the frame A B. They project rearward, to be used by the attendant walking behind in guiding this machine, which is used to chop out or thin the cotton in the rows, by being drawn across the said rows.

The object of adjusting the wheel along the frame D is to so arrange it relatively to the plows, in respect of the distance from them, that the machine may be adapted for rows of any distance apart, the requirement being that, when the wheels are going down the descent of the row across which they have just passed, the hoes will act upon the said row, cutting out the cotton, and when the wheels pass beyond the bottom of the descent, the cutters will pass beyond the row and be kept out of contact with the earth until the wheels are in the descent of the next row.

This makes the work light, and gives a chance for the cutters or hoes to be cleaned of all earth, weeds, cotton-plants, &c.

Having thus described my invention,

What I claim as new, and desire to secure by Letters Patent, is—

The arrangement of the frames A B and D, adjustable wheel E, and the cutters C, all substantially as specified.

E. M. GREESON.

Witnesses:
NATHL. G. BURKE,
P. HENRY BURKE.